United States Patent
You et al.

(10) Patent No.: US 12,507,916 B2
(45) Date of Patent: Dec. 30, 2025

(54) METHOD FOR TRANSMITTING AND RECEIVING BIOMETRIC INFORMATION WITHOUT LOSS BASED ON TRANSMISSION PACKET IDENTIFIER IN CONTINUOUS BLOOD GLUCOSE MONITOR SYSTEM

(71) Applicant: I-SENS, INC., Seoul (KR)

(72) Inventors: Choong Beom You, Seoul (KR); Ye Jeong Lee, Seoul (KR); Hun Woo Heo, Seoul (KR); A Ri Seo, Seoul (KR)

(73) Assignee: I-SENS, INC., Seoul (KR)

( * ) Notice: Subject to any disclaimer, the term of this patent is extended or adjusted under 35 U.S.C. 154(b) by 480 days.

(21) Appl. No.: 17/797,727

(22) PCT Filed: Feb. 19, 2021

(86) PCT No.: PCT/KR2021/002097
§ 371 (c)(1),
(2) Date: Aug. 5, 2022

(87) PCT Pub. No.: WO2021/167386
PCT Pub. Date: Aug. 26, 2021

(65) Prior Publication Data
US 2023/0076499 A1 Mar. 9, 2023

(30) Foreign Application Priority Data
Feb. 19, 2020 (KR) .................. 10-2020-0020122

(51) Int. Cl.
*A61B 5/145* (2006.01)
*H04L 1/1607* (2023.01)

(52) U.S. Cl.
CPC ........ *A61B 5/14532* (2013.01); *H04L 1/1671* (2013.01)

(58) Field of Classification Search
CPC ... A61B 5/14532; A61B 5/0015; A61B 5/155; A61B 5/14503; A61B 5/150847;
(Continued)

(56) References Cited

U.S. PATENT DOCUMENTS 8,755,269 B2 * 6/2014 Jollota ................. H04W 72/02
370/242
9,083,541 B1 * 7/2015 Olsen ................. H04L 12/1868
(Continued)

FOREIGN PATENT DOCUMENTS

JP 4-111553 4/1992
JP 2005-538794 12/2005
(Continued)

OTHER PUBLICATIONS

International Search Report for PCT/KR2021/002097 mailed on May 31, 2021 and its English translation from WIPO (now published as WO 2021/167386).
(Continued)

*Primary Examiner* — Gary Mui
(74) *Attorney, Agent, or Firm* — WOMBLE BOND DICKINSON (US) LLP

(57) ABSTRACT

The present disclosure relates to a method for transmitting/receiving biometric information in a continuous glucose monitoring system, and more specifically, to a method for transmitting/receiving biometric information, in which, in each communication cycle, first, an identifier of the last transmit packet received by a communication terminal is transmitted to a sensor transmitter, and the sensor transmitter transmits, to the communication terminal, a transmit packet generated after the last transmit packet, and thus biometric information generated by the sensor transmitter may be transmitted without loss to the communication terminal.

13 Claims, 13 Drawing Sheets

(58) Field of Classification Search
CPC ... H04L 1/1671; H04L 47/2416; H04L 47/34; H04L 47/28; H04L 47/2483
See application file for complete search history.

(56) References Cited

U.S. PATENT DOCUMENTS

| | | | |
|---|---|---|---|
| 10,750,952 B2* | 8/2020 | Jin | A61B 5/14532 |
| 2014/0334375 A1* | 11/2014 | Sugitani | H04L 1/1835 370/315 |
| 2015/0195210 A1* | 7/2015 | Tsuruoka | H04L 1/1835 370/235 |
| 2015/0359490 A1 | 12/2015 | Massey et al. | |
| 2017/0124350 A1* | 5/2017 | Reihman | A61B 5/746 |
| 2022/0257119 A1* | 8/2022 | You | H04L 67/12 |

FOREIGN PATENT DOCUMENTS

| | | |
|---|---|---|
| JP | 2009-81571 | 4/2009 |
| JP | 2013-502978 | 1/2013 |
| JP | 2014-531172 | 11/2014 |
| JP | 2015-119910 | 7/2015 |
| JP | 2017-503619 | 2/2017 |
| JP | 2017-108384 | 6/2017 |
| JP | 2017-118325 | 6/2017 |
| JP | 2018-538721 | 12/2018 |
| JP | 2019-33322 | 2/2019 |
| KR | 10-2007-0031810 | 3/2007 |
| KR | 10-2008-0031175 | 4/2008 |
| KR | 10-2011-0121445 | 11/2011 |
| KR | 10-2018-0132555 | 12/2018 |
| WO | 2017/105600 | 6/2017 |

OTHER PUBLICATIONS

Written Opinion of the International Searching Authority for PCT/KR2021/002097 mailed on May 31, 2021 and its English translation by Google Translate (now published as WO 2021/167386).
Extended European Search Report dated Dec. 21, 2023 for European Patent Application No. 21756240.4.
Office Action dated Aug. 20, 2024 for Japanese Patent Application No. 2022-548085 and its English translation from Global Dossier.
Office Action dated Feb. 4, 2025 for Japanese Patent Application No. 2022-548085 and its English translation from Global Dossier.
Notice of Allowance dated Jun. 24, 2025 for Japanese Patent Application No. 2022-548085 and its English translation from Global Dossier.

* cited by examiner

[Fig. 1]
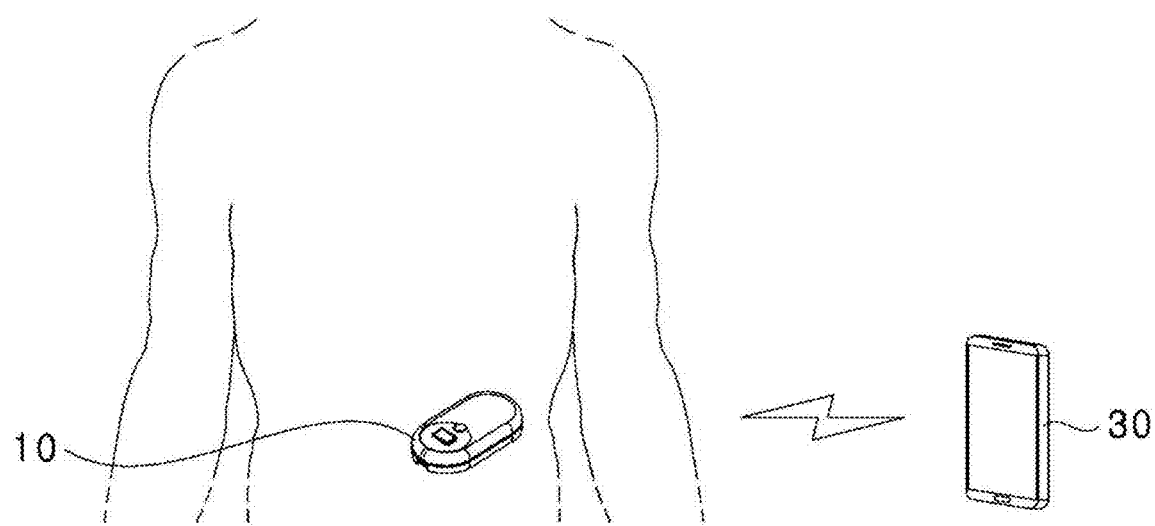

[Fig. 2]
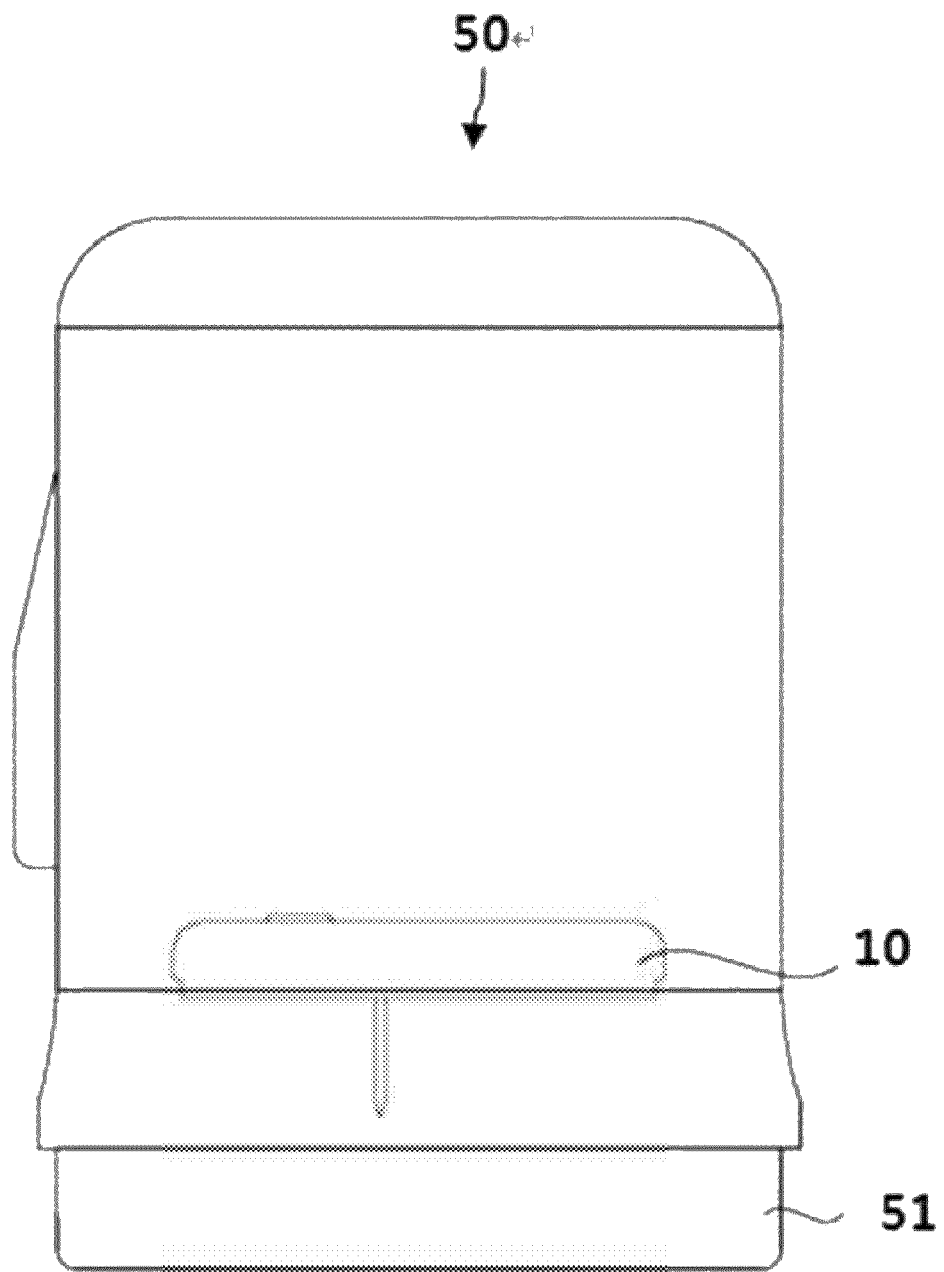

[Fig. 3]
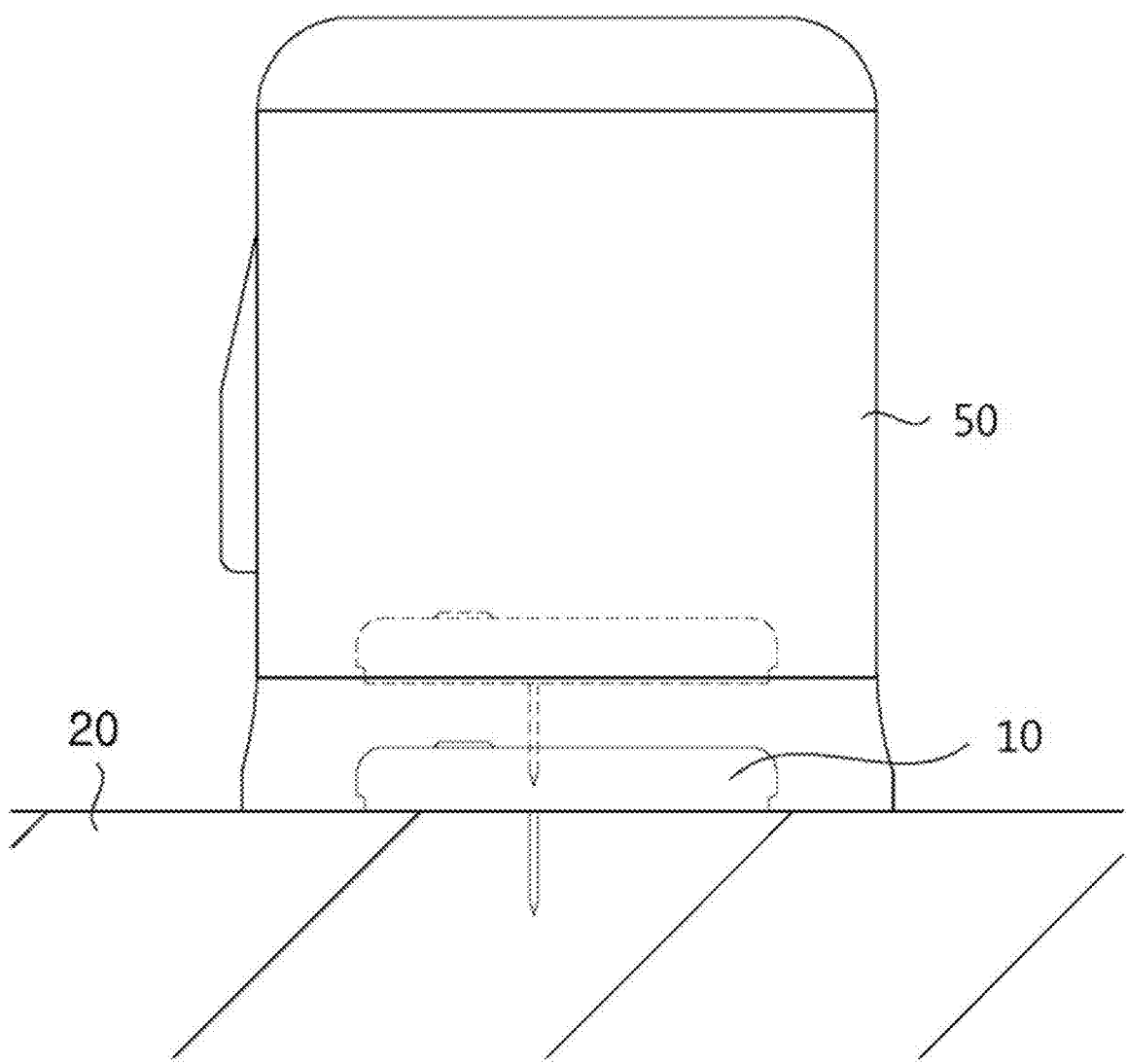

[Fig. 4]
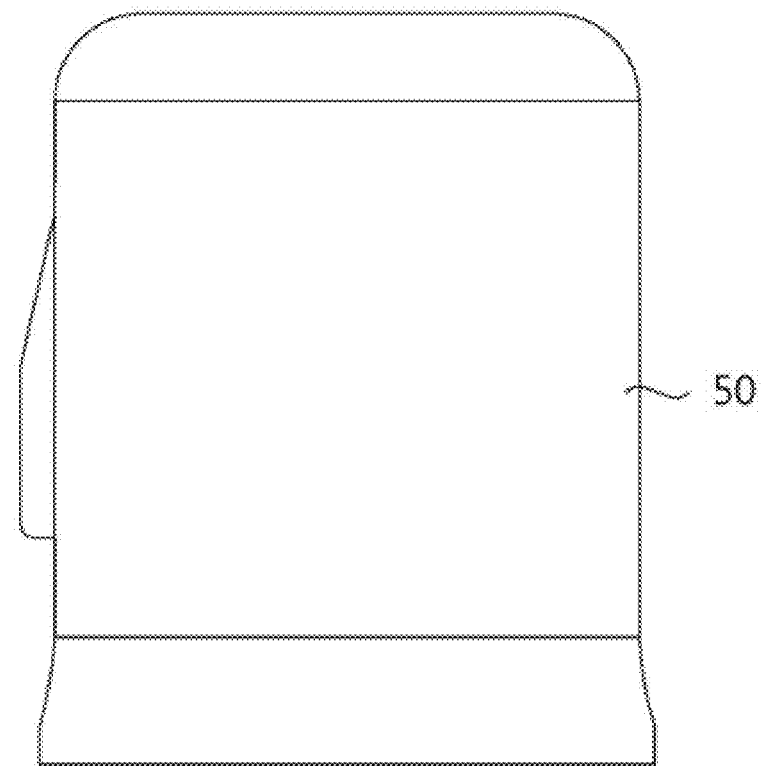
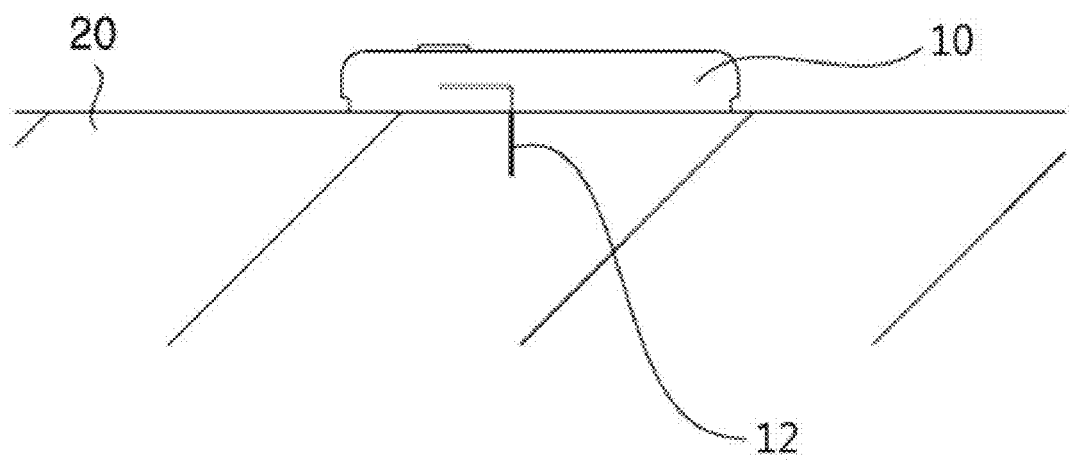

[Fig. 5]
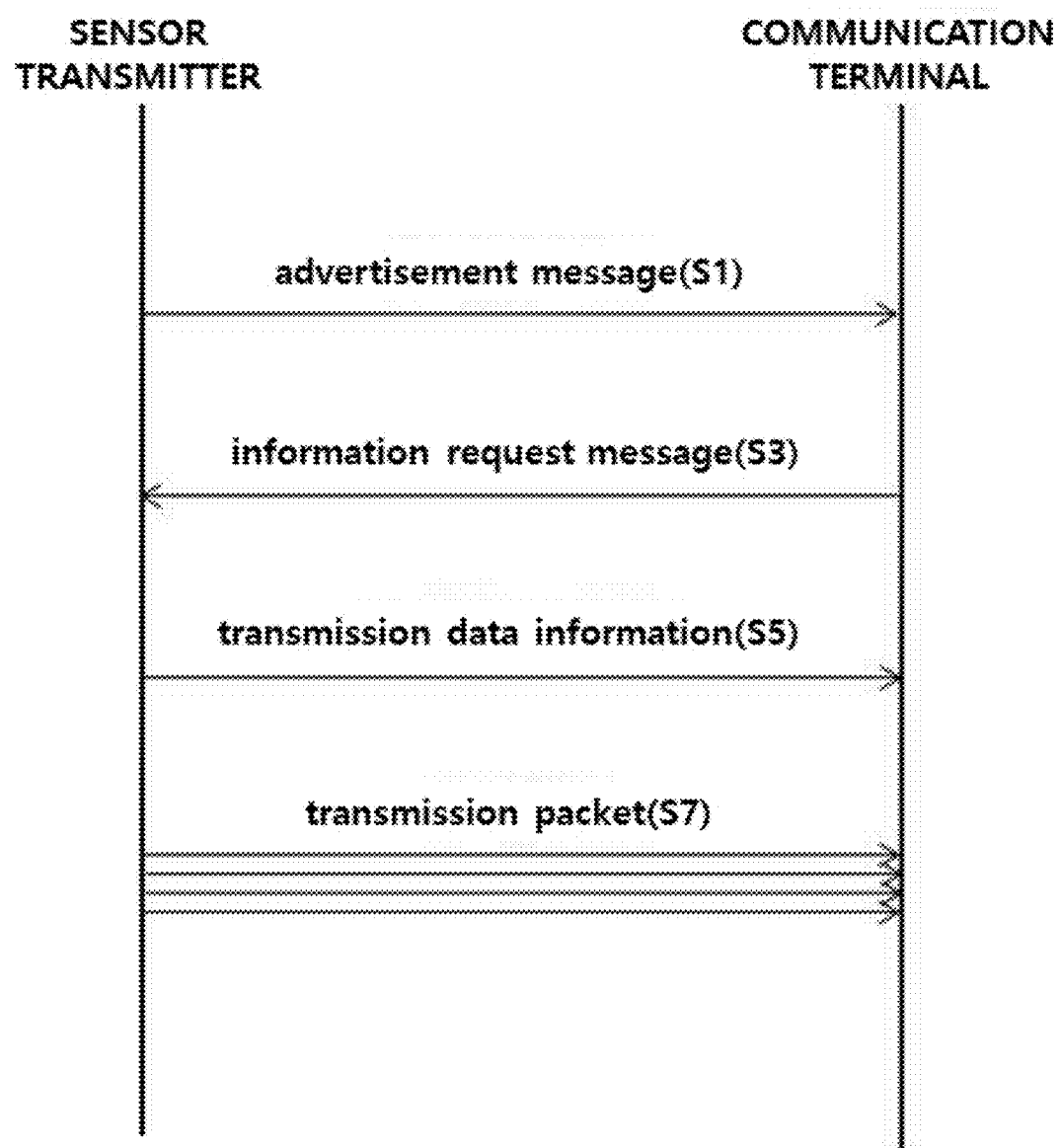

[Fig. 6]
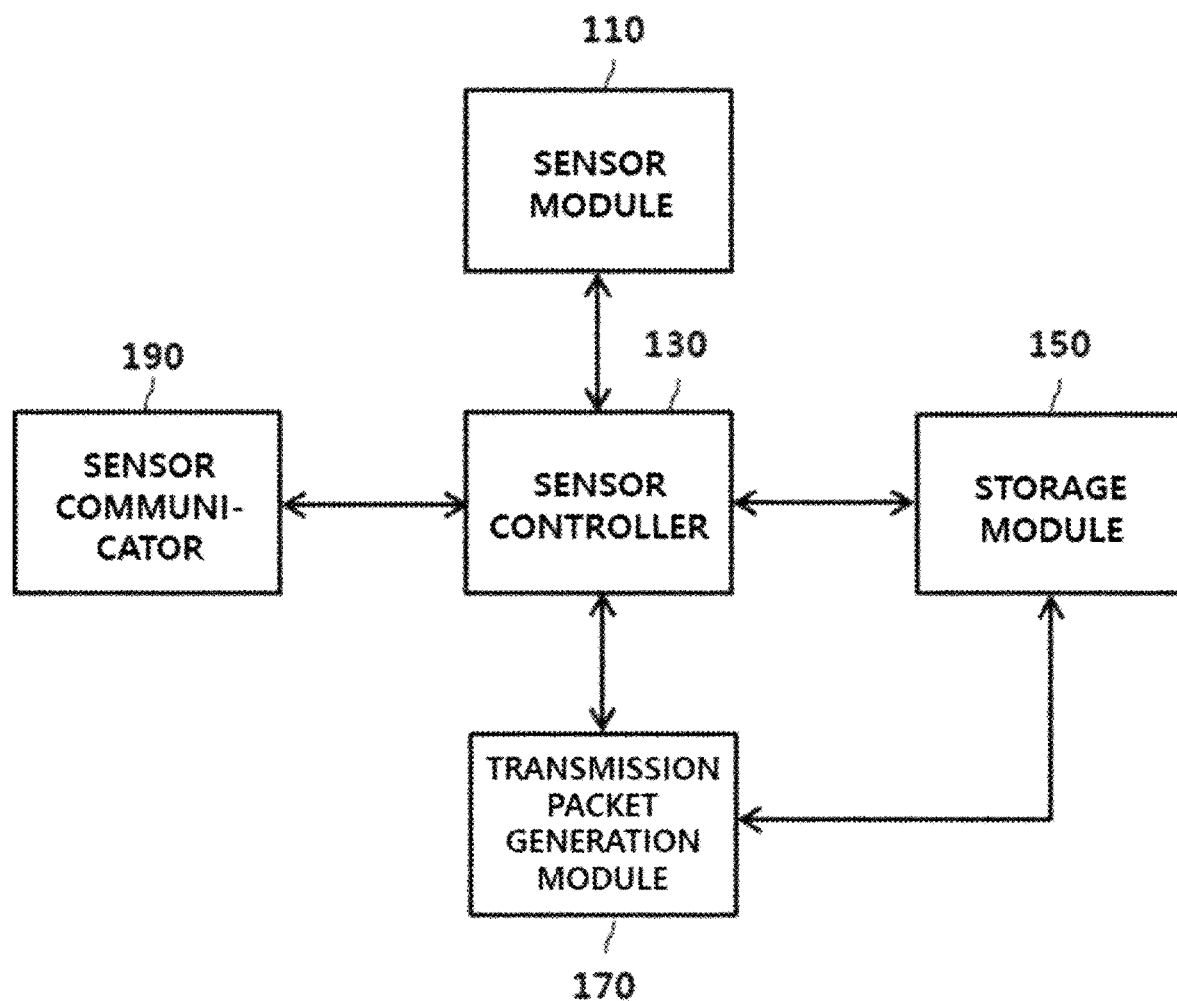

[Fig. 7]
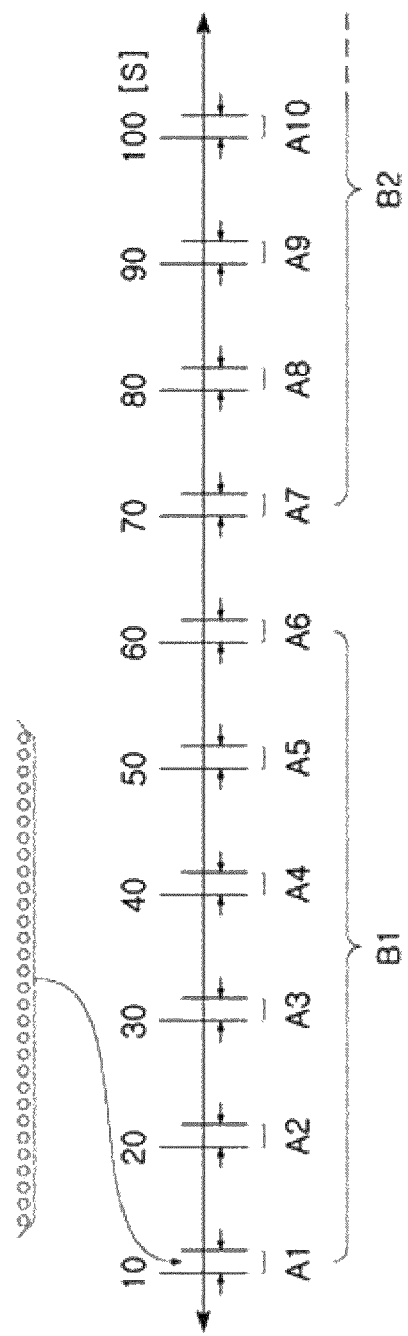

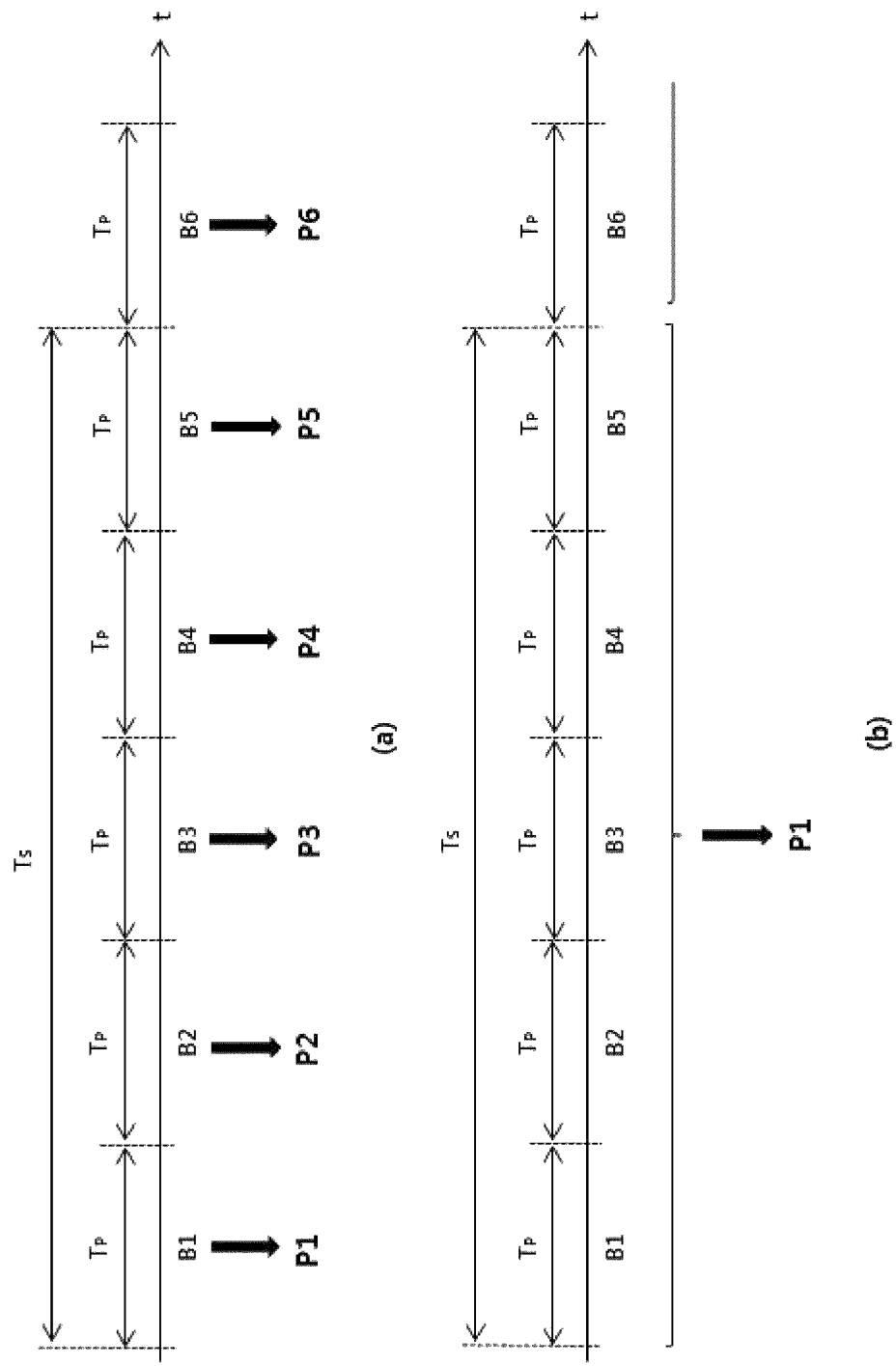
[Fig. 8]

[Fig. 9]
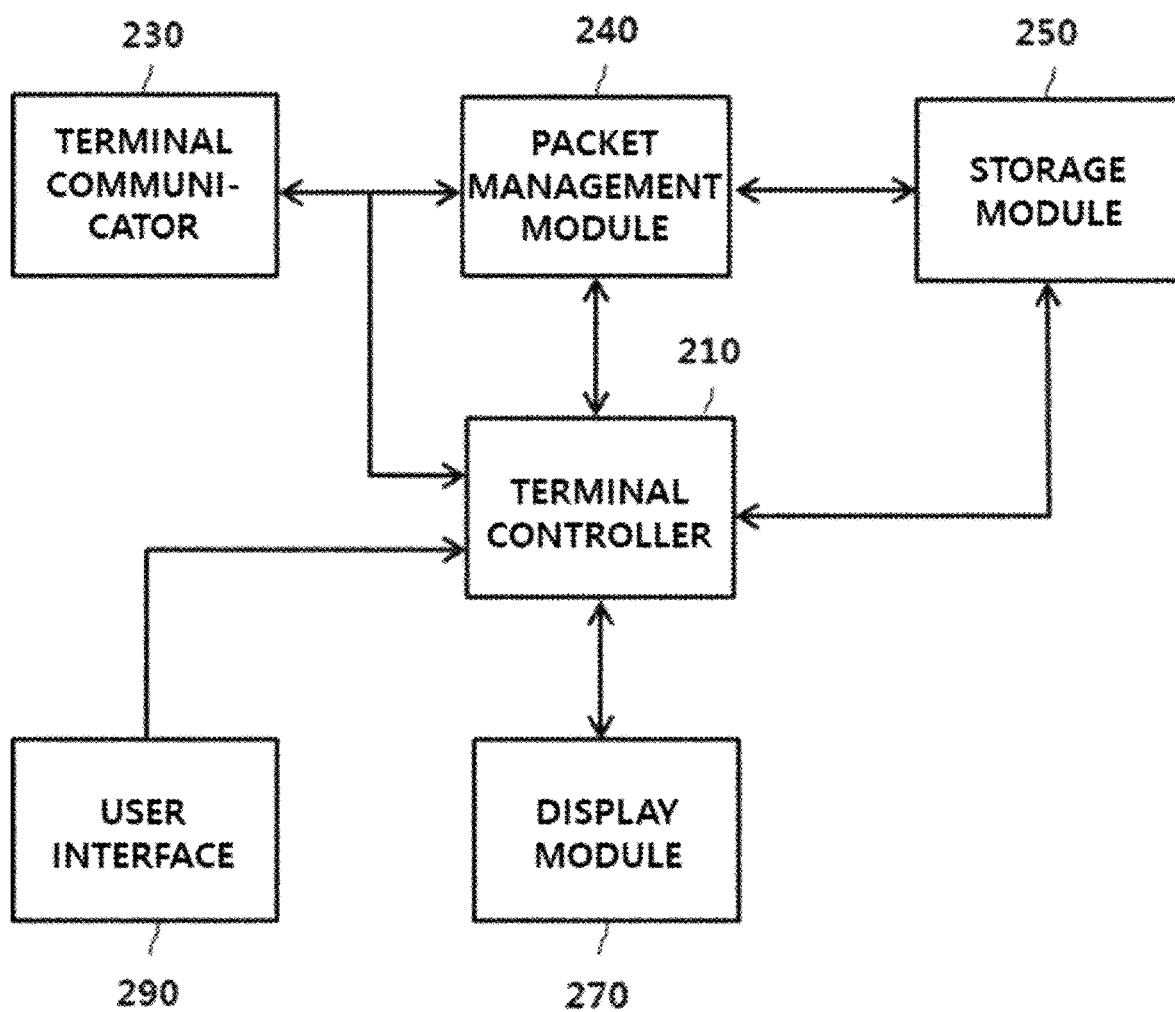

[Fig. 10]
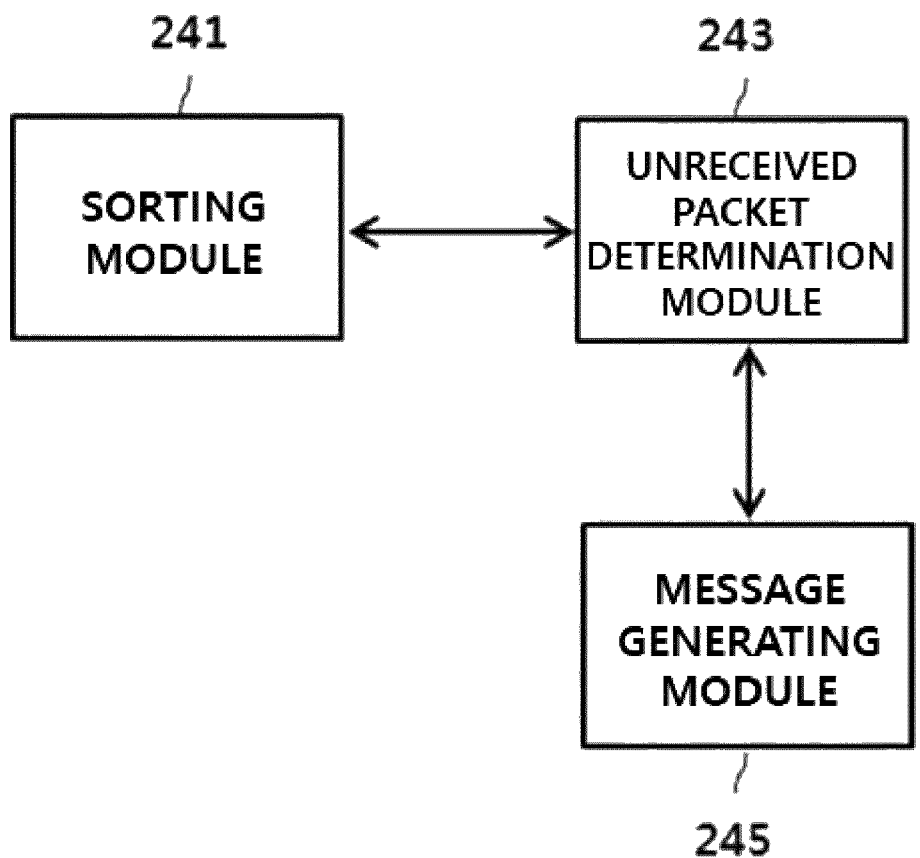

[Fig. 11]
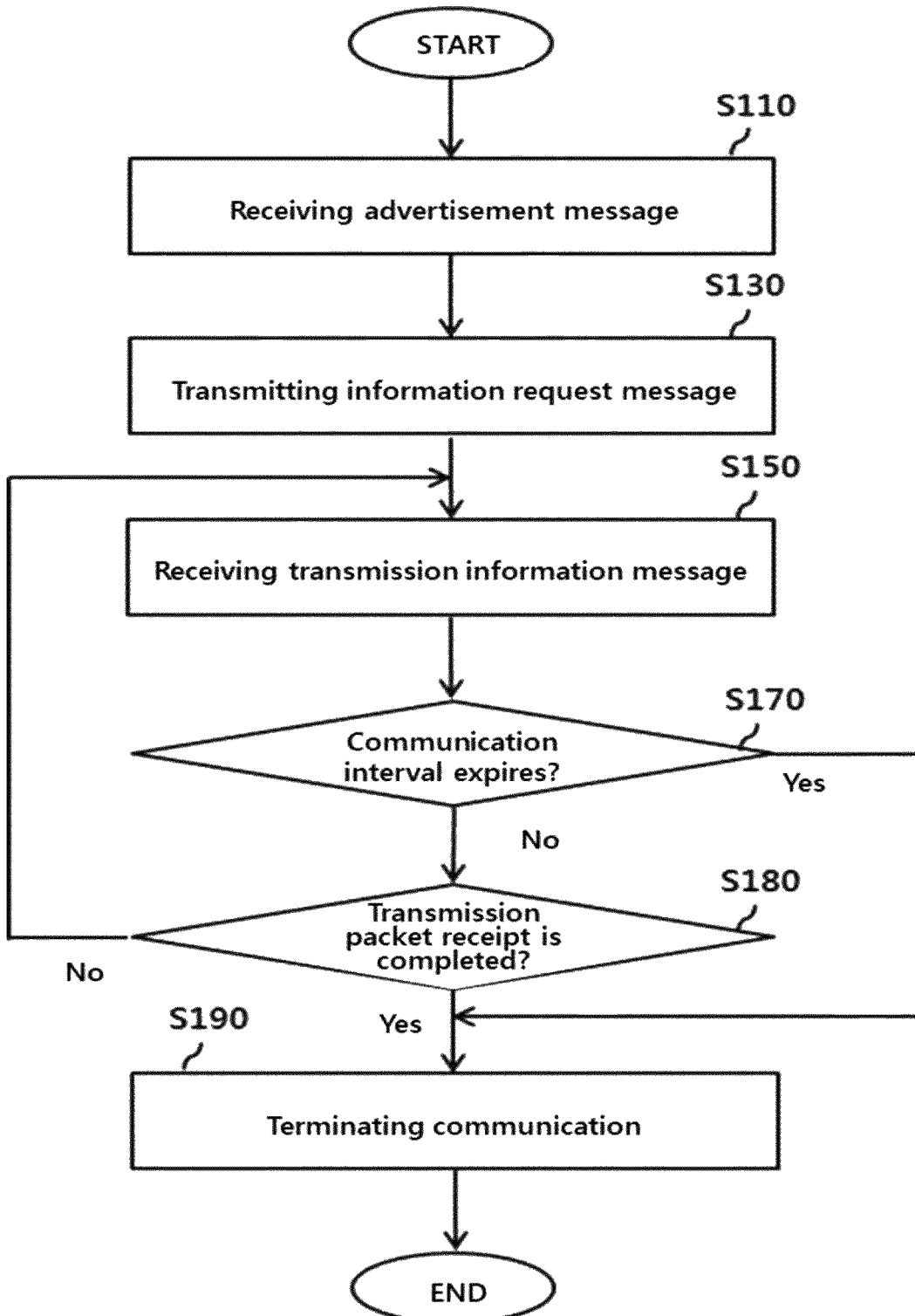

[Fig. 12]
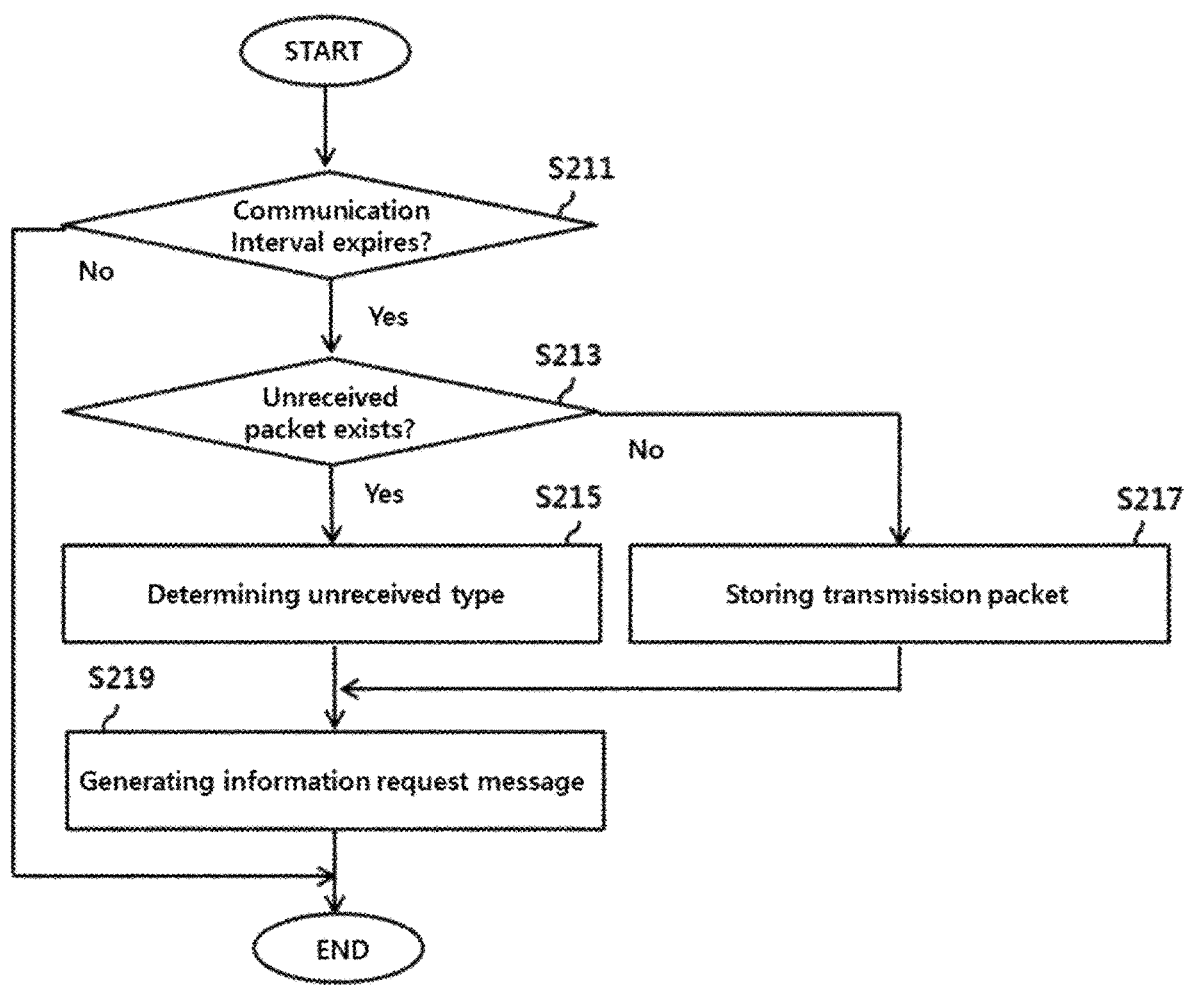

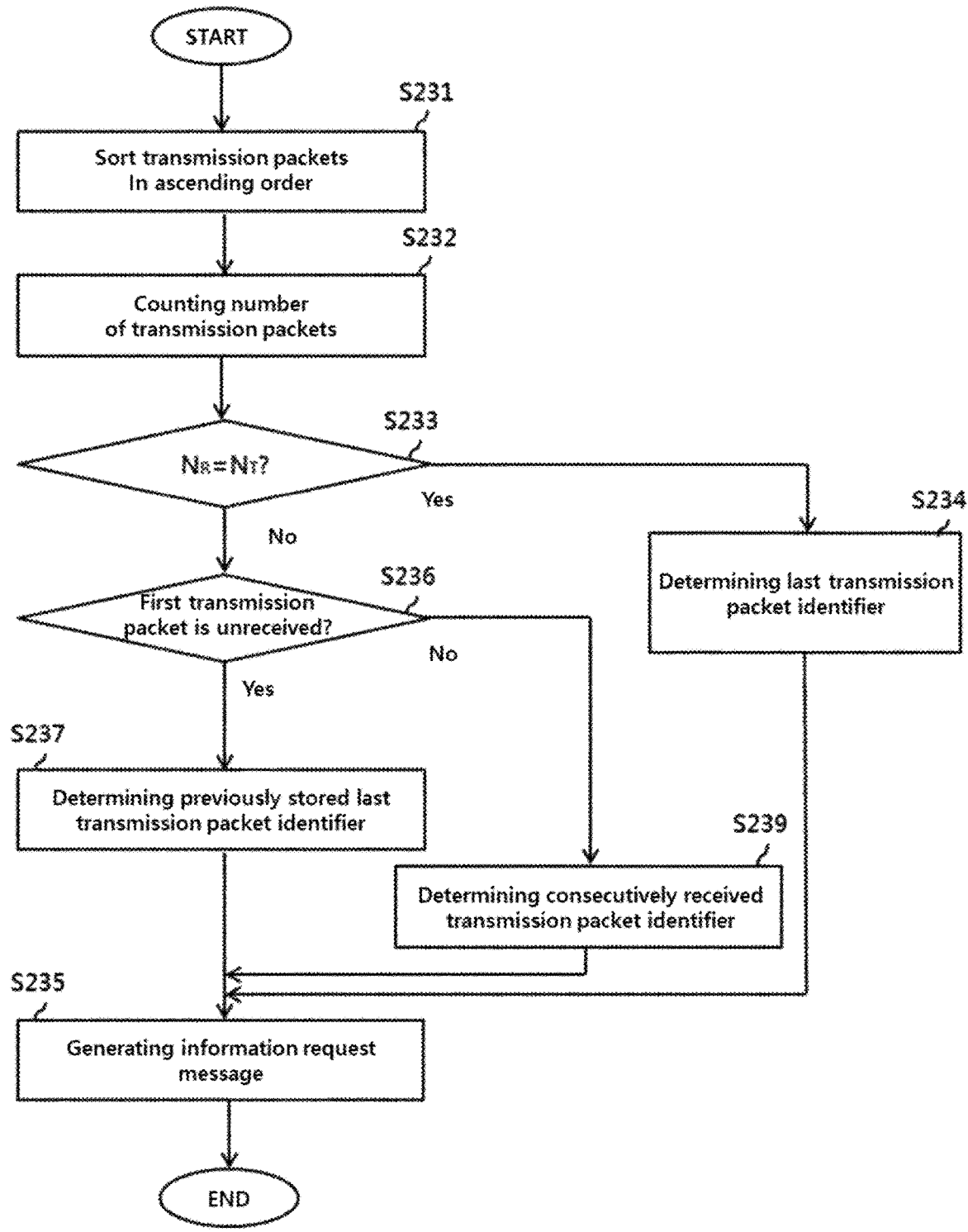

METHOD FOR TRANSMITTING AND RECEIVING BIOMETRIC INFORMATION WITHOUT LOSS BASED ON TRANSMISSION PACKET IDENTIFIER IN CONTINUOUS BLOOD GLUCOSE MONITOR SYSTEM

CROSS-REFERENCE TO RELATED APPLICATIONS

The present application is the U.S. National Phase of PCT Application No. PCT/KR2021/002097 filed on Feb. 19, 2021, which claims the priority to Korean Patent Application No. 10-2020-0020122 filed on Feb. 19, 2020, the entire contents of which are incorporated herein by reference.

TECHNICAL FIELD

The present disclosure generally relates to a method for transmitting and receiving biometric information in a continuous blood glucose monitor system, and more specifically, a method for transmitting and receiving biometric information, the method in which an identifier of a transmission packet received last in each communication cycle by a communication terminal is transmitted to a sensor transmitter first and the sensor transmitter transmits a transmission packet generated after the last transmission packet to the communication terminal, thereby transmitting biometric information generated by the sensor transmitter to the communication terminal without loss.

BACKGROUND

Diabetes is a chronic medical condition that is common in modern people, and in the Republic of Korea, there are 2 million diabetes patients, about 5% of the total population.

Diabetes occurs when the absolute level of the sugar level in blood is high due to the absolute deficiency or relative insufficiency of insulin, produced by the pancreas, caused by various reasons such as obesity, stress, poor eating habits, and inherited hereditary factors and imbalance regarding glucose in the blood.

The blood usually contains a certain concentration of glucose, and tissue cells gain energy from the glucose.

However, when the glucose is increased excessively more than needed, the glucose cannot be properly stored in the liver, muscle, or adipose tissue and is accumulated in the blood, because of this, patients with diabetes maintain a much higher blood glucose level than normal people, and as excessive blood glucose passes through the tissues and is discharged into the urine, it results in deficiency of glucose, which is absolutely necessary for all tissues of the body, thereby causing abnormalities in respective body tissues.

Diabetes is characterized by substantial absence of subjective symptoms at the beginning of the condition, when diabetes progresses, diabetes-specific symptoms such as overdrink, overeat, polyuria, weight loss, weariness, skin itchiness, and lower ability of naturally healing on injury on hands and feet are shown, and further progression of diabetes leads to complications such as visual disturbances, hypertension, kidney disease, paralysis, periodontal disease, muscle spasms and neuralgia, as well as gangrene.

In order to diagnose diabetes beforehand and manage to prevent the progression of diabetes into complications associated therewith, systematic blood glucose measurement and treatment should be performed.

Diabetes need to constantly measure blood glucose for management, so the demand for devices related to blood glucose measurement is steadily increasing. It has been confirmed through various studies that, when diabetic patients strictly control the management of blood glucose, the incidence of complications of diabetes is significantly reduced. Accordingly, it is very important for diabetic patients to measure blood glucose regularly for blood glocuse management.

In general, a finger prick type method is mainly used for blood glucose control in diabetic patients. This blood prick type method helps diabetic patients to manage their blood glucose, but because only the result at the time of measurement is displayed, there is a problem that it is difficult of precisely monitoring the blood glucose level that changes frequently. In addition, since the blood prick type blood glucose meter needs to collect blood every time to measure blood glucose frequently during the day, there is a problem in that the burden of blood collection is huge for diabetic patients.

Diabetics patients generally experience hyperglycemia and hypoglycemia, and an emergency may occur in the hypoglycemic conditions. Hypoglycemia occurs when sugar content is not kept for a long time, and the patients may become unconscious or die in a worst case. Accordingly, rapid discovery of the hypoglycemic condition is critically important for diabetics. The figure prick type blood glucose meter intermittently measuring glucose have limited ability to accurately measure blood glucose levels.

Recently, to overcome such a drawback, continuous glucose monitoring systems (CGMSs) inserted into the human body to measure a blood glucose level every few minutes have been developed, and therefore easily perform the management of diabetics and responses to an emergency situation.

The continuous glucose monitoring system includes a sensor transmitter configured to be attachable to a body part of a user and measure blood glucose by extracting body fluid, a communication terminal configured to output the received blood glucose level, and so on. The sensor transmitter measures the blood glucose of the user in a status that a sensor is inserted to a human body for a certain period, for example, fifteen (15) days, and generates blood glucose information. The sensor transmitter periodically generates blood glucose information, and the communication terminal periodically receives and outputs the blood glucose information so that the user can check the received blood glucose information.

In the continuous blood glucose measurement system described above, the sensor transmitter and the communication terminal transmit and receive blood glucose information in a wired communication type or a wireless communication type, and the communication terminal must continuously receive transmission packets from the sensor transmitter without loss.

However, it may occur that the communication terminal cannot continuously receive blood glucose information from the sensor transmitter due to temporary communication disconnection between the sensor transmitter and the communication terminal or the user's inexperienced operation, and as a result, the user may be unable to continuously monitor the user's blood glucose information through the communication terminal.

DETAILED DESCRIPTION OF DISCLOSURE

Technical Problem

To solve the problem of the conventional method of transmitting and receiving biometric information between a sensor transmitter and a communication terminal described above, the purpose of the present disclosure may be for providing a method of, when generating transmission packets in the sensor transmitter, generating a transmission packet including an identifier for identifying the transmission packet according to generation order of the transmission packet and being capable of transmitting and receiving biometric information without loss of a transmission packet through the identifier of the transmission packet.

Another purpose of the present disclosure is for providing a method for transmitting and receiving biometric information, the method in which an identifier of a transmission packet received last in each communication cycle by a communication terminal is transmitted to a sensor transmitter first and the sensor transmitter transmits a transmission packet generated after the last transmission packet to the communication terminal without loss.

Still another purpose of the present disclosure is for providing a method for transmitting and receiving biometric information, the method in which an identifier of a last transmission packet received every communication interval by a communication terminal is transmitted to a sensor transmitter, and the sensor transmitter calculates information on the total number of transmission packets to be transmitted to the communication terminal during a communication interval based on the identifier of the last transmission packet and provides it to the communication terminal, thereby being unnecessary to transmit and receive an additional message that confirms whether a transmission packet has been successfully received between the communication terminal and the sensor transmitter.

Still another purpose of the present disclosure is for providing a method for transmitting and receiving biometric information, the method of determining whether an unreceived transmission packet exists based on the total number of transmission packets to be transmitted by a sensor transmitter and an identifier of a transmission packet received from the sensor transmitter and requesting to receive the unreceived transmission packet during a next communication interval.

Solution to Problem

To accomplish the purpose of the present disclosure, a method for transmitting and receiving biometric information according to an embodiment of the present disclosure may comprise: receiving, by a communication terminal, a total number of transmission packets to be transmitted by a sensor transmitter, from the sensor transmitter; by the communication terminal, receiving the transmission packets from the sensor transmitter for a set first communication interval and storing the received transmission packets; and by the communication terminal, when the communication terminal receives the transmission packets as many as the total number of the transmission packets from the sensor transmitter based on the total number of the transmission packets or when the first communication interval ends, terminating communication with the sensor transmitter.

Here, when communication between the communication terminal and the sensor transmitter is terminated, a receipt completion message is not received or transmitted between the communication terminal and the sensor transmitter.

Here, the sensor transmitter generates the transmission packets to be transmitted to the communication terminal, the transmission packets including the biometric information measured through a measurement sensor, and the transmission packets comprise generation identifiers for identifying the transmission packets according to order of generating the transmission packets.

Preferably, a method for transmitting and receiving biometric information according to an embodiment of the present disclosure may further comprise transmitting, from the communication terminal to the sensor transmitter, an information request message including an identifier of a last transmission packet previously stored in the communication terminal.

Here, the sensor transmitter calculates the total number of the transmission packets to be transmitted to the communication terminal during the first communication interval based on the identifier of the previously stored last transmission packet received from the communication terminal.

Preferably, a method for transmitting and receiving biometric information according to an embodiment of the present disclosure may further comprise: counting a number of the transmission packets received from the sensor transmitter based on the generation identifiers of the transmission packets; and determining an identifier received last in the first communication interval.

Preferably, a method for transmitting and receiving biometric information according to another embodiment of the present disclosure may further comprise sorting the generation identifiers of the transmission packets received during the first communication interval in ascending order.

Preferably, a method for transmitting and receiving biometric information according to an embodiment of the present disclosure may further comprise, in a second communication interval consecutive to the first communication interval, by the communication terminal, transmitting, to the sensor transmitter, an information request message including an identifier of a transmission packet received last in the first communication interval, wherein a total number of transmission packets to be transmitted to the communication terminal by the sensor transmitter during the second communication interval based on transmission packets newly generated after the identifier of the transmission packet received last in the first communication interval based on the identifier of the transmission packet received last in the first communication interval.

Preferably, a method for transmitting and receiving biometric information according to an embodiment of the present disclosure may further comprise, by the communication terminal, determining whether a transmission packet in next order of the identifier of the transmission packet received last in the first communication interval, previously stored in the communication terminal, among the transmission packets received during the first communication interval has been received, wherein if the transmission packet in next order of the identifier of the transmission packet received last in the first communication interval, previously stored in the communication terminal, among the transmission packets received during the first communication interval has not been received, an information request message including the identifier of the last transmission packet previously stored in the communication terminal is transmitted to the sensor transmitter.

Preferably, a method for transmitting and receiving biometric information according to another embodiment of the present disclosure may further comprise, by the communication terminal, determining whether one or more transmission packets which are not consecutively received during the first communication interval exist based on the identifiers of the transmission packets received during the first communication interval, wherein when the one or more transmission packets which are not consecutively received during the first communication interval exist, an information request message including an identifier of a last transmission packet among transmission packets consecutively received during the first communication interval is transmitted to the sensor transmitter in the second communication interval.

Preferably, a method for transmitting and receiving biometric information according to still another embodiment of the present disclosure may further comprise determining one or more identifiers of unreceived transmission packets during the first communication interval based on the total number of the transmission packets to be transmitted by the sensor transmitter during the first communication interval and identifiers of transmission packets received by the communication terminal during the first communication interval, wherein an information request message including the one or more identifiers of the unreceived transmission packets during the first communication interval is transmitted to the sensor transmitter.

Advantageous Effects of Invention

A method for transmitting and receiving a transmission packet according to embodiments of the present disclosure has the following effects.

First, a method for transmitting and receiving a transmission packet according to an embodiment of the present disclosure, when generating transmission packets in the sensor transmitter, generates a transmission packet including an identifier for identifying the transmission packet according to generation order of the transmission packet and is capable of transmitting and receiving biometric information without loss of a transmission packet through the identifier of the transmission packet.

Second, in a method for transmitting and receiving a transmission packet according to an embodiment of the present disclosure, an identifier of a last transmission packet received every communication interval by a communication terminal is transmitted to a sensor transmitter, and the sensor transmitter calculates information on the total number of transmission packets to be transmitted to the communication terminal during a communication interval based on the identifier of the last transmission packet and provides it to the communication terminal, thereby transmitting and receiving biometric information without loss of a transmission packet even though not transmitting a transmission completion message by the sensor transmitter after completing the transmission of the transmission packet and not transmitting a receipt completion message by the communication terminal after completing the receipt of the transmission packet.

Third, in a method for transmitting and receiving a transmission packet according to an embodiment of the present disclosure, an identifier of a transmission packet received last in each communication cycle by a communication terminal is transmitted to a sensor transmitter first and the sensor transmitter transmits a transmission packet generated after the last transmission packet to the communication terminal, thereby transmitting biometric information generated by the sensor transmitter to the communication terminal without loss.

Fourth, a method for transmitting and receiving a transmission packet according to an embodiment of the present disclosure determines whether an unreceived transmission packet exists based on the total number of transmission packets to be transmitted by a sensor transmitter and an identifier of a transmission packet received from the sensor transmitter and provides an identifier of a transmission packet received last by the communication terminal based on the unreceived transmission packet, thereby being capable of requesting to receive the unreceived transmission packet during a next communication interval.

BRIEF DESCRIPTION OF THE DRAWINGS

FIG. 1 is a schematic diagram for illustrating a continuous blood glucose measurement system according to an embodiment of the present disclosure.

FIG. 2 is a figure illustrating an applicator for attaching a sensor transmitter to a part of a human body according to an embodiment of the present disclosure.

FIGS. 3 and 4 are figures for illustrating a process of attaching a sensor transmitter to a human body using an applicator according to an embodiment of the present disclosure.

FIG. 5 is a figure for explaining a message transmitted and received between a sensor transmitter and a communication terminal.

FIG. 6 is a functional block diagram for illustrating a sensor transmitter according to an embodiment of the present disclosure.

FIG. 7 is a figure for illustrating an example of generating biometric information in a sensor transmitter.

FIG. 8 is a figure for illustrating an example of generating a transmission packet in a sensor transmitter.

FIG. 9 is a functional block diagram for illustrating a communication terminal according to an embodiment of the present disclosure.

FIG. 10 is a functional block diagram for illustrating an exemplary embodiment of a packet management module according to the present disclosure.

FIG. 11 is a flowchart for illustrating a method for receiving biometric information from a sensor transmitter according to an embodiment of the present disclosure.

FIG. 12 is a flowchart for illustrating an example of generating an information request message after termination of communication.

FIG. 13 is a flowchart for illustrating an example of generating an information request message according to an unreceived type of a transmission packet.

DESCRIPTION OF EMBODIMENTS OF DISCLOSURE

The technical terms used in the present disclosure are only for the purpose of describing exemplary embodiments, and they are not intended to limit the present invention. Also, unless otherwise defined, all technical terms used herein should be construed as having the same meaning as commonly understood by those skilled in the art, and should not be interpreted as being excessively inclusive or excessively restrictive. In addition, when a technical term used herein is an erroneous technical term that does not accurately represent the idea of the present invention, it should be understood as replacing the term by a technical term which can be properly understood by those skilled in the art.

Further, singular expressions used in the present specification include plural expressions unless they have definitely opposite meanings. In the present application, it shall not be construed that terms, such as "including" or "comprising", various constituent elements or steps described in the specification need to be all essentially included, and it shall be construed that some constituent elements or steps among the various constituent elements or steps may be omitted, or additional constituent elements or steps may be further included.

Also, it should be noted that the accompanying drawings are merely illustrated to easily explain the spirit of the invention, and therefore, they should not be construed to limit the spirit of the invention by the accompanying drawings.

Hereinafter, with reference to the enclosed drawings, a method for receiving and transmitting biometric information according to an embodiment of the present disclosure is described in detail.

FIG. 1 is a schematic diagram for illustrating a continuous blood glucose measurement system according to an embodiment of the present disclosure.

Referring to FIG. 1, the continuous blood glucose measurement system (1) according to an embodiment of the present disclosure comprises a sensor transmitter (10) and a communication terminal (30).

The sensor transmitter (10) is attachable to human body and, when the sensor transmitter (10) is attached to the human body, an end portion of a sensor of the sensor transmitter (10) is inserted into skin to periodically extract body fluid of the human body and measure blood glucose.

The communication terminal (30) is a terminal configured to receive blood glucose information from the sensor transmitter (10) and output or display the received blood glucose information to a user, and for example, the communication terminal (30) may be a portable terminal (such as smartphone, tablet PC, or notebook and so on) configured to communicate with the sensor transmitter (10). However, the communication terminal (30) is not limited thereto, and may be any type of a terminal to which has a communication function and program or application can be installed.

The sensor transmitter (10) transmits the blood glucose information in response to request of the communication terminal (30) or at predetermined times periodically, and for data communication between the sensor transmitter (10) and the communication terminal (30), the sensor transmitter (10) and the communication terminal (30) are communicationally connected to each other over a wire by an USB cable and so on or communicationally connected in an wireless communication means such as infrared communication, NFC communication, Bluetooth, etc.

Here, the sensor transmitter (10) is attached to a part of the human body by an applicator, FIG. 2 is a figure illustrating an applicator for attaching a sensor transmitter to a part of a human body according to an embodiment of the present disclosure, and FIGS. 3 and 4 are figures for illustrating a process of attaching a sensor transmitter to a human body using an applicator according to an embodiment of the present disclosure.

Firstly, an application (50) is now described by referring to FIG. 2, the sensor transmitter (10) is mounted in the applicator (50), and the applicator (50) can be operated so that the sensor transmitter (10) can be outwardly discharged to the outside of the applicator (50) by the manipulation of the user and then be attached to a specific portion of the human body of the user. The applicator (50) is formed to have a shape that one side of the applicator (50) is open, and the sensor transmitter (10) is installed to the applicator (50) through the open side of the applicator (50).

When the sensor transmitter (10) is attached to a part of the human body using the applicator (0), for inserting an end portion of the sensor included in the sensor transmitter (10) to skin, the applicator (50) comprises a needle (not shown) formed to cover the end portion of the sensor therein, a first elastic means (not shown) pushing the needle and the end portion of the sensor together towards the skin, and a second elastic means (not shown) configured to retract the needle only. The compressed state of the first elastic means (not shown) arranged to be compressed inside the applicator (50) by the configuration of the applicator (50) can be released, thereby inserting the needle and the end portion of the sensor simultaneously to the skin, and when the end portion of the sensor is inserted to the skin, the compressed state of the second elastic means (not shown) is released, thereby extracting the needle only. By the applicator (50), the user can safely and easily attach the sensor transmitter (10) to the skin.

A process of attaching the sensor transmitter (10) to the human body will be described in detail with reference to FIGS. 3 and 4, in a state that a protection cap (51) is separated or removed, an open side of the applicator (50) is closely placed on a specific part of skin (20) of the human body. When the applicator (50) is operated in a state that the applicator (130) is closely placed on the skin (20) of the human body, the sensor transmitter (10) is outwardly discharged from the applicator (50) and then attached to the skin (20). Here, an end portion of the sensor (12) is arranged to be exposed from the sensor transmitter (10) at a lower portion of the sensor transmitter (10), and a part of the end portion of the sensor (12) is inserted into the skin (20) by a needle installed at the applicator (50). Accordingly, the sensor transmitter (110) can be attached to the sensor (12) in a state that an end portion of the sensor (12) is inserted to the skin (20).

In the embodiment of the present disclosure, an adhesive tape is provided at a surface of the sensor transmitter (10) contacting the human body so that the sensor transmitter (10) can be attached to the skin (20). Accordingly, if the applicator (50) is moved away from the skin (20) of the human body, the sensor transmitter (10) is fixedly attached to the skin (20) of the human body by the adhesive tape.

After that, if the power is supplied to the sensor transmitter (10), the sensor transmitter (10) is communicationally connected with the applicator (50), and the sensor transmitter (10) transmits the measured blood glucose information to the communication terminal.

The sensor transmitter (10) can measure not only the blood glucose information but also various biometric information, and hereinafter blood glucose information is illustrated as one of examples of biometric information.

FIG. 5 is a figure for explaining a message transmitted and received between a sensor transmitter and a communication terminal.

Referring to FIG. 5, when a transmission packet including measured blood glucose information is generated, the sensor transmitter periodically transmits the generated transmission packet to the communication terminal at a set communication interval, and the sensor transmitter transmits an advertisement message to one or more peripheral devices in order to transmit the transmission packet every communication period (S1).

The communication terminal receiving the advertisement message connects communication with the sensor transmitter, and, when the communication is connected between the communication terminal and the sensor transmitter, the communication terminal transmits an information request message to the sensor transmitter (S3). Here, the information request message includes an identifier of a last transmission packet previously stored in the communication terminal or information on the total number of transmission packets received and stored by the communication terminal, and the identifier of the transmission packet may be a serial number assigned according to the order at which the transmission packet is generated by the sensor transmitter and the total number of transmission packets received by the communication terminal may be determined based on the identifier of the previously stored last transmission packet.

The sensor transmitter calculates the total number of transmission packets to be transmitted from the sensor transmitter to the communication terminal during the communicationally connected communication interval based on the identifier of the last transmission packet previously stored in the communication terminal, and transmission packet information including information on the total number of transmission packets to be transmitted from the sensor transmitter to the communication terminal during the communication interval is transmitted to the communication terminal (S5). Accordingly, the sensor transmitter continuously measures biometric information to generate a transmission packet even when the communication is not connected with the communication terminal, and the total number of transmission packets to be transmitted to the communication terminal during the connected communication interval is determined by counting the number of transmission packets generated after the identifier of the last transmission packet previously stored in the communication terminal.

The communication terminal receives transmission packets from the sensor transmitter during the communication interval, and when transmission packets as many as the total number of transmission packets from the sensor transmitter are received or when the set communication interval expires, the communication with the sensor transmitter is terminated (S7).

The communication terminal may determine the total number of transmission packets to be received from the sensor transmitter by the communication terminal from the total number of transmission packets included in the transmission packet information, and the communication terminal counts the number of transmission packets received from the sensor transmitter during the connected communication interval and if transmission packets are received as many as the total number of transmission packets, the communication with the sensor transmitter is terminated even when the communication interval has not elapsed.

When transmitting and receiving a transmission packet between the communication terminal and the sensor transmitter or when terminating the communication between the communication terminal and the sensor transmitter, the communication terminal does not additionally generate or transmit, a receipt completion message, notifying whether the transmission packet has been received, to the sensor transmitter and the sensor transmitter does not additionally generate or transmit, a transmission completion message, notifying whether the transmission packet has been transmitted, to the communication terminal.

In the embodiment of the present disclosure, instead of using the receipt completion message or the transmission completion message, an identifier of the last transmission packet received by the communication terminal is transmitted to the sensor transmitter first at each communication interval, and the sensor transmitter calculates the total number of transmission packets to be transmitted to the communication terminal during the communication interval based on the identifier of the last transmission packet and provides it to the communication terminal so that biometric information can be transmitted and received without loss of a transmission packet even if the sensor transmitter does not transmit the transmission completion message after the transmission of the transmission packets is completed or even if the communication terminal does not transmit the receipt completion message after the receipt of the transmission packets is completed.

FIG. 6 is a functional block diagram for illustrating a sensor transmitter according to an embodiment of the present disclosure.

The detailed descriptions are provided as follows by referring to FIG. 6, a sensor module (110) includes a sensor, and a part of the sensor is inserted into the human body and the sensor measures blood glucose information.

A sensor control module or controller (130) receives the blood glucose information measured from the sensor module (110) and stores the received blood glucose information to a storage module (150). Here, the blood glucose information received from the sensor module (110) by the sensor controller (130) may be an analog signal, and the sensor controller (130) removes noise from the analog signal and transforms it to a digital signal to generate blood glucose information.

The sensor controller (130) increments a count every time when blood glucose information is generated, and stores the total number of the blood glucose information to the storage module (150). Meanwhile, the sensor controller (130) controls a transmission packet generation module (170) so that, when the number of the generated blood glucose information counted by the sensor controller (130) reaches a predetermined number of blood glucose information, one or more transmission packets are generated from the plurality of blood glucose information.

According to the control of the sensor controller (130), the transmission packet generation module (170) generates a transmission packet consisting of sequential blood glucose information for a certain time period by combining blood glucose information which is sequentially stored in a time order to the storage module (150). Here, the transmission packet generation module (170) generates a transmission packet by including a transmission packet identifier for identifying each transmission packet every time when generating a transmission packet.

The sensor controller (130) increments a count every time when the transmission packet is generated by the transmission packet generation module (170), and then stores the total number of the transmission packets to the storage module (150).

The sensor controller (130) transmits an advertisement message through the sensor communicator (190) at certain transmission intervals to connect communication with the communication terminal, and the sensor controller (130) receives an identifier of a last transmission packet previously stored in the communication terminal during the communication connection, compares the identifier of the previously stored last transmission packet with an identifier of a transmission packet stored in the storage module (150), and calculates the number of transmission packets newly generated and stored in the storage module (150) after the last transmission packet is previously stored to the communication terminal. The sensor controller (130) determines the number of transmission packets newly generated and stored after the last transmission packet is previously stored to the communication terminal as the total number of transmission packets to be transmitted to the communication terminal during the communication interval, and controls to transmit information on the determined total number of transmission packets to the communication terminal.

FIG. 7 is a figure for illustrating an example of generating biometric information in a sensor transmitter.

First, data regarding a biometric signal measured by a sensor module are measured at every certain time period as described above, and, for every one time period for the measurement, multiple time measurement can be performed. For example, the sensor module measures biometric signal data every ten (10) seconds. At that time, every time when one unit measurement is performed, biometric signals are measured thirty (30) times, and the time consumed for measuring the biometric signals may be one (1) second. Accordingly, the sensor module measures thirty (30) analog biometric signal data every ten (10) seconds.

Accordingly, for example, blood glucose information can be measured every ten (10) seconds, such as thirty (30) times measurements of blood glucose information between 2 o'clock 14 minute 25 second and 2 o'clock 14 minute 26 second PM, and another thirty (30) times measurements of blood glucose information between 2 o'clock 14 minute 35 second and 2 o'clock 14 minute 36 second PM.

The measured biometric signal data is transformed into a digital signal by the sensor controller. The sensor transmitter calculates one average value every ten (10) seconds by calculating an average value of thirty (30) blood glucose information data transformed to the digital signal by a trimmed average calculation way. At that time, seven (7) highest data and seven (7) lowest data among the thirty (30) blood glucose information data are removed and an average value (A) of remaining sixteen (16) data is calculated.

The trimmed average value (A) calculated by way of being described above can be generated every ten (10) seconds, and, as illustrated, six (6) trimmed average values (A1 to A6) can be generated for one (1) minute.

Additionally, six (6) trimmed average values (A1 to A6) are generated for one (1) minute, and a second trimmed average value (B1) is generated using the generated six (6) trimmed average values (A1 to A6). At that time, the generated second trimmed average value (B1) is calculated by removing a maximum value and a minimum value among six (6) trimmed average values (A1 to A6) and calculating an average of remaining four values. Accordingly, blood glucose information is generated from one second trimmed average value (B) for one (1) minute.

The blood glucose information data generated every (1) minute is stored at the storage module by the sensor controller, and the stored blood glucose information can be generated as a transmission packet to be transmitted to the communication terminal through the sensor communicator.

FIG. 8 is a figure for illustrating an example of generating a transmission packet in a sensor transmitter, and regarding an example of generating a transmission packet with reference to FIG. 8(a), blood glucose information (B1, B2, B3, B4, B5, B6, . . . ) is generated sequentially at each set blood glucose information generation period ($T_P$), and, each time the blood glucose information is generated, a transmission packet (P1, P2, P3, P4, P5, P6) having corresponding blood glucose information is generated. When the transmission packet is generated, a series of unique identifiers are allocated according to order of the generation of the transmission packets, and the transmission packet is generated to include the identifier of the transmission packet and blood glucose information. Preferably, a sequence sequentially increasing according to order of the generation of the transmission packets may be allocated as an identifier of a transmission packet, or the time of the generation of the transmission packet may be allocated as an identifier of a transmission packet.

The generated transmission packets (P1, P2, P3, P4, P5, P6) are stored in a storage module, and when a set communication period ($T_S$) is reached, the transmission packets (P1, P2, P3, P4, P5) stored in the storage module are respectively transmitted to the communication terminal.

Regarding another example of generating a transmission packet with reference to FIG. 8(b), blood glucose information (B1, B2, B3, B4, B5, B6, . . . ) is generated sequentially at each set blood glucose information generation period ($T_P$) and is stored in the storage module every time the blood glucose information is generated, and when a set communication period ($T_S$) is reached, a transmission packet (P1) including all blood glucose information stored in the storage module for the communication period is generated and the generated transmission packet (P1) is transmitted to the communication terminal.

FIG. 9 is a functional block diagram for illustrating a communication terminal according to an embodiment of the present disclosure.

Referring to FIG. 9, when an advertisement message transmitted from a sensor transmitter at each set communication interval is received, a terminal controller (210) connects the communication with the sensor transmitter through the terminal communicator (230), and, even before the communication interval elapses, terminates the communication with the communication terminal when the communication interval elapses or when the receipt of the transmission packet from the sensor transmitter is completed.

Meanwhile, when connecting the communication with the sensor transmitter, a packet management module (240) determines an identifier of a last transmission packet previously stored in a storage module (250) based on an identifier of a transmission packet stored to the storage module (250) according to the control of the terminal controller (210), and generates an information request message including the identifier of the previously stored last transmission packet and transmits the generated information request message to the sensor transmitter through the terminal communicator (230).

The packet management module (240) determines whether transmission packets have been received as many as the total number of transmission packets notified by the sensor transmitter based on the identifier of the transmission packet received from the sensor transmitter during the connected communication interval, and, if there is a transmission packet that has not been received from the sensor transmitter, determines a non-received type and selectively stores the received transmission packets to the storage module (250). The packet management module (240) determines the identifier of the last stored transmission packet among the transmission packets stored in the storage module (250), and generates an information request message having the identifier of the last stored transmission packet and transmits it to the sensor transmitter in the next communication interval.

Meanwhile, the terminal controller (210) outputs biometric information of the received transmission packet to the display module (270) so that the user can check it.

Preferably, when a transmission packet or biometric information which has not been received from the sensor transmitter exists, the terminal controller (210) outputs the existence of the unreceived transmission packet on the display module (270), and, even before a next communication interval, the unreceived transmission packet or biometric information can be requested from the sensor transmitter when a command for requesting the receipt of the unreceived transmission packet is inputted through a user interface module (290).

FIG. 10 is a functional block diagram for illustrating an exemplary embodiment of a packet management module according to the present disclosure.

Referring to FIG. 10 in more detail, a sorting module (241) sorts transmission packets received from the sensor transmitter during the connected communication interval in ascending order of identifiers. A unreceived packet determination module (243) counts the number of transmission packets received during the communication interval based on the identifiers of the transmitted packets actually received by the communication terminal during the communication interval, and determines whether there is an unreceived transmission packet based on the counted number of the transmission packets and the total number of transmission packets to be transmitted by the sensor transmitter during the communication interval, received from the sensor transmitter.

When no unreceived transmission packet exists, the unreceived packet determination module (243) controls to store transmission packets received during the communication interval to the storage module. However, if an unreceived transmission packet exists, whether the unreceived transmission packet is a first transmission packet or an intermediate transmission packet among the transmission packets to be transmitted by the sensor transmitter during the communication interval is determined. According to an unreceived type of a transmission packet, the unreceived packet determination module (243) is configured to, if one or more transmission packets including the first transmission packet are not received, delete all transmission packets received during the communication interval without storing them to the storage module, and, if the first transmission packet is received but transmission packets including and subsequent to the intermediate transmission packet are not continuously received, delete all transmission packets including and subsequent to the unreceived transmission packet and control to store transmission packets continuously received from the first transmission packets to the storage module.

For example, if transmission packets to be received from the sensor transmitter during the communication interval are P1, P2, P3, P4, P5 and transmission packets actually received from the sensor transmitter are P2, P3, P4, P5, an operation of deleting actually received transmission packets (P2, P3, P4, P5) is controlled to be performed because the first transmission packet (P1) is not received. However, if transmission packets to be received from the sensor transmitter during the communication interval are P1, P2, P3, P4, P5 and transmission packets actually received from the sensor transmitter are P1, P2, P4, P5, an operation of storing transmission packets (P1, P2) received continuously from the first transmission packet and deleting transmission packets (P4, P5) not continuously received is controlled to be performed.

A message generating module (245) determines an identifier of a last transmission packet previously stored in the storage module, generates an information request message having the identifier of the last transmission packet stored in the storage module, and when the communication with the sensor transmitter is connected at a set communication interval, the generated information request message is transmitted to the sensor transmitter first.

FIG. 11 is a flowchart for illustrating a method for receiving biometric information from a sensor transmitter according to an embodiment of the present disclosure.

Referring to FIG. 11, the communication terminal receives an advertisement message from the sensor transmitter every set communication period (S110). In response to the advertisement message, the communication terminal and the sensor transmitter connect communication to each other, and since the communication connection is well known, a detailed description thereof will be omitted.

When the communication between the sensor transmitter and the communication terminal is connected, the communication terminal transmits an information request message to the sensor transmitter first (S130). The information request message includes an identifier of a last transmission packet previously stored in the communication terminal.

The sensor transmitter generates a transmission information message having information on the total number of transmission packets to be transmitted to the communication terminal by the sensor transmitter during a communication interval of a communicationally connected communication period based on the identifier of the last transmission packet previously stored in the communication terminal, and the communication terminal receives the transmission information message from the sensor transmitter first before receiving a transmission packet received from the sensor transmitter (S150).

Whether the communication interval of the corresponding communication period elapses is determined (S170), and if the communication interval has not elapsed, whether all transmission packets to be transmitted from the sensor transmitter have been received is determined (S180).

When the reception of all transmission packets to be transmitted from the sensor transmitter is completed, the received transmission packets are stored to the storage module and then the communication is terminated (S190). However, if the communication interval has not elapsed and all transmission packets to be transmitted from the sensor transmitter have not received, an operation of receiving transmission packets transmitted from the sensor transmitter is continued until the communication interval elapses. However, when the communication interval elapses in a state in which all transmission packets to be transmitted from the sensor transmitter are not received, the communication is terminated (S190).

According to an embodiment of the present disclosure, the sensor transmitter can transmit a transmission packet subsequent to a previously stored last transmission packet among transmission packets generated and stored by the sensor transmitter based on an identifier of a transmission packet previously stored last to the communication terminal, and the communication terminal can determine the number of transmission packets to be received by the communication terminal during the communication interval of the corresponding communication period based on the total number of transmission packets.

Through this, when there is an unreceived transmission packet during a communication interval of a corresponding communication period, the communication terminal provides information on the unreceived transmission packet to the sensor transmitter in a next communication period so that the transmission packets can be received without loss of a transmission packet.

In addition, there is no need to generate or transmit a separate reception completion message for confirming whether the communication terminal has completed the receipt of the transmission packets or a separate transmission completion message for confirming whether the sensor transmitter has completed the transmission of the transmission packets.

FIG. 12 is a flowchart for illustrating an example of generating an information request message after termination of communication.

Referring to FIG. 12, whether a communication interval of a communication period connected to communication elapses is determined (S211). When the communication interval has elapsed, whether there is an unreceived transmission packet is determined (S213).

When all transmission packets to be transmitted by the sensor transmitter are received, all received transmission packets are stored to the storage module (S217), and an information request message having an identifier of a last transmission packet among the stored transmission packets is generated and then the generated information request message is transmitted to the sensor transmitter in a next communication period (S219).

On the other hand, if there is a transmission packet that has not been received from the sensor transmitter, an unreceived type of the transmission packets is determined (S215), and the received transmission packets are selectively stored according to the determined unreceived type, an information request message including an identifier of a last transmission packet among the stored transmission packets is generated and then the generated information request message is transmitted to the sensor transmitter in a next communication period (S219).

FIG. 13 is a flowchart for illustrating an example of generating an information request message according to an unreceived type of a transmission packet.

Referring to FIG. 13, transmission packets received during a communication interval of a communication cycle are arranged based on identifiers (S231). Preferably, the transmitted packets received during the communication interval of the communication period are sorted in ascending order of the identifiers.

The number of transmission packets received from the sensor transmitter during the communication interval of the communication cycle is counted based on the identifiers of the sorted transmission packets (S232), and whether an unreceived transmission packet exists is determined by comparing the total number ($N_T$) of transmission packets to be transmitted from the sensor transmitter during the communication interval with the number ($N_R$) of transmitted packets actually received by the communication terminal during the communication interval (S233).

When there is no unreceived transmission packet, all received transmission packets are stored to the storage module and an identifier of a last transmission packet among the transmission packets stored in the storage is determined (S224) and an information request message including the determined identifier of the last transmission packet is generated (S235).

On the other hand, if an unreceived transmission packet exists, whether a first transmission packet among transmission packets to be transmitted from the sensor transmitter during a communication interval is not received is determined (S236). If the first transmission packet is not received, all transmission packets received from the sensor transmitter during the communication interval are discarded without storing them and an identifier of a last transmission packet previously stored in the storage module is determined (S237), and an information request message including the identifier of the last transmission packet previously stored in the storage module is generated (S235).

On the other hand, if one or more unreceived transmission packets exist, the first transmission packet among the transmission packets to be transmitted from the sensor transmitter during the communication interval is received and some transmission packets are not received after the first transmission packet, only transmission packets received continuously after the first transmission packet are stored, all transmission packets including and subsequent to the unreceived transmission packet are discarded, and an identifier of a last transmission packet stored in the storage module is determined (S239), and an information request message including the identifier of the last transmission packet stored in the storage module is generated (S235).

Meanwhile, the exemplary embodiments of the present disclosure described above can be implemented through programs executable at computers, and can be operated in a general-purpose digital computer executing the programs using computer readable medium.

The above-referenced computer readable medium comprises storage medium such as magnetic storage media (e.g., ROM, floppy disks, hard disks, etc.), optical recording media (e.g., CD-ROMs, DVDs, etc.), and carrier waves (e.g., transmission through the Internet).

Although the present disclosure is described with reference to embodiments shown in the drawings in order to explain certain principles of the present disclosure by way of example, a person having ordinary skill in the art which the present disclosure relates could make various modifications and equivalent other embodiments. Accordingly, the protection scope of the present disclosure shall be defined by the claims attached hereto and all of their equivalents.

What is claimed is:

1. A method for communicating biometric information between a sensor transmitter configured to be attachable to a body part of a user and measure the biometric information of the user and a communication terminal configured to receive the biometric information from the sensor transmitter, the method comprising:
   receiving, by the communication terminal, a total number of transmission packets to be transmitted from the sensor transmitter to the communication terminal in a first communication interval, from the sensor transmitter;
   receiving, by the communication terminal, at least a portion of the transmission packets from the sensor transmitter in the first communication interval and storing the received transmission packets; and
   terminating, by the communication terminal, communication with the sensor transmitter,
   wherein the communication terminal terminates the communication with the sensor transmitter without receiving or transmitting a receipt completion message between the communication terminal and the sensor transmitter before the first communication interval elapses when the number of the transmission packets received by the communication terminal is the same as the total number of transmission packets.

2. The method for communicating the biometric information according to claim 1, wherein:
   the sensor transmitter generates the transmission packets to be transmitted to the communication terminal, the transmission packets including the biometric information measured through a measurement sensor, and
   the transmission packets comprise generation identifiers for identifying the transmission packets according to order of generating the transmission packets.

3. The method for communicating the biometric information according to claim 2, further comprising transmitting, from the communication terminal to the sensor transmitter, an information request message including an identifier of a last transmission packet previously stored in the communication terminal before the total number of transmission packets is received by the communication terminal.

4. The method for communicating the biometric information according to claim 3, wherein the sensor transmitter calculates the total number of the transmission packets to be transmitted to the communication terminal during the first communication interval based on the identifier of the last transmission packet previously stored in the communication terminal.

5. The method for communicating the biometric information according to claim 3, further comprising:
counting a number of the transmission packets received from the sensor transmitter based on the generation identifiers of the transmission packets; and
determining an identifier received last in the first communication interval.

6. The method for communicating the biometric information according to claim 5, further comprising sorting the generation identifiers of the transmission packets received during the first communication interval in ascending order.

7. The method for communicating the biometric information according to claim 5, further comprising, in a second communication interval consecutive to the first communication interval, by the communication terminal, transmitting, to the sensor transmitter, an information request message including an identifier of a transmission packet received last in the first communication interval,
wherein a total number of transmission packets to be transmitted to the communication terminal by the sensor transmitter during the second communication interval is determined based on transmission packets newly generated after the identifier of the transmission packet received last in the first communication interval based on the identifier of the transmission packet received last in the first communication interval.

8. The method for communicating the biometric information according to claim 7, further comprising, by the communication terminal, determining whether a next transmission packet following the transmission packet received last in the first communication interval, previously stored in the communication terminal, among the transmission packets received during the first communication interval has been received,
wherein if the next transmission packet following the transmission packet received last in the first communication interval, previously stored in the communication terminal, among the transmission packets received during the first communication interval has not been received, an information request message including the identifier of the last transmission packet previously stored in the communication terminal is transmitted to the sensor transmitter.

9. The method for communicating the biometric information according to claim 8, further comprising, by the communication terminal, determining whether one or more transmission packets which are not consecutively received during the first communication interval exist based on the identifiers of the transmission packets received during the first communication interval,
wherein when the one or more transmission packets which are not consecutively received during the first communication interval exist, an information request message including an identifier of a last transmission packet among transmission packets consecutively received during the first communication interval is transmitted to the sensor transmitter in the second communication interval.

10. The method for communicating the biometric information according to claim 7, further comprising determining one or more identifiers of unreceived transmission packets during the first communication interval based on the total number of the transmission packets to be transmitted by the sensor transmitter during the first communication interval and identifiers of transmission packets received by the communication terminal during the first communication interval,
wherein an information request message including the one or more identifiers of the unreceived transmission packets during the first communication interval is transmitted to the sensor transmitter.

11. A method for transmitting and receiving biometric information between a sensor transmitter configured to be attachable to a body part of a user and measure the biometric information of the user and a communication terminal configured to receive the biometric information from the sensor transmitter, the method comprising:
connecting communication between the communication terminal and the sensor transmitter;
transmitting, from the communication terminal to the sensor transmitter, an information request message including an identifier of a last transmission packet previously stored in the communication terminal;
determining whether a transmission packet generated after the identifier of the last transmission packet in the sensor transmitter exists based on the identifier of the last transmission packet; and
transmitting, from the sensor transmitter to the communication terminal, transmission packet information indicating a total number of transmission packets to be transmitted from the sensor transmitter to the communication terminal in a first communication interval;
receiving, by the communication terminal, at least a portion of the transmission packets from the sensor transmitter in the first communication interval; and
terminating, by the communication terminal, communication with the sensor transmitter,
wherein the communication terminal terminates the communication with the sensor transmitter without receiving or transmitting a receipt completion message between the communication terminal and the sensor transmitter before the first communication interval elapses when the number of the transmission packets received by the communication terminal is the same as the total number of the transmission packets.

12. The method for transmitting and receiving the biometric information according to claim 11, wherein:
the sensor transmitter generates the transmission packets to be transmitted to the communication terminal in the first communication interval, the transmission packets including biometric information measured through a measurement sensor, and
the transmission packet includes generation identifiers for identifying the transmission packets according to generation order of the transmission packets.

13. The method for transmitting and receiving the biometric information according to claim 12, wherein the communication terminal determines the identifier of the last transmission packet previously stored in the communication terminal and generates the information request message including the identifier of the last transmission packet.

* * * * *